(12) United States Patent
Alvarado et al.

(10) Patent No.: US 11,599,235 B1
(45) Date of Patent: Mar. 7, 2023

(54) MOBILE-GENERATED DESKTOP REMINDERS

(71) Applicant: Slack Technologies, LLC, San Francisco, CA (US)

(72) Inventors: Catherine Yesenia Alvarado, San Francisco, CA (US); Madhu Balakrishna, Sagar (IN); Akshay Bakshi, Vancouver (CA); Beau Carlborg, Oakland, CA (US); Jon Papandreas Chmura, Truckee, CA (US); Ryan Greenberg, Montclair, NJ (US); Vanessa Bahk, Saratoga, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/523,574

(22) Filed: Nov. 10, 2021

(30) Foreign Application Priority Data

Sep. 21, 2021 (IN) .............................. 202121042657

(51) Int. Cl.
*G06F 3/0481* (2022.01)
*H04L 67/306* (2022.01)

(52) U.S. Cl.
CPC .......... *G06F 3/0481* (2013.01); *H04L 67/306* (2013.01)

(58) Field of Classification Search
CPC .............................. G06F 3/0481; H04L 67/306
See application file for complete search history.

(56) References Cited

U.S. PATENT DOCUMENTS

| | | | |
|---|---|---|---|
| 7,526,559 B1* | 4/2009 | Phillips | H04L 67/02 709/227 |
| 8,171,137 B1* | 5/2012 | Parks | H04M 1/72412 709/224 |
| 8,823,507 B1* | 9/2014 | Touloumtzis | H04L 67/26 709/224 |
| 9,462,570 B1* | 10/2016 | Bostick | G06F 40/30 |
| 9,479,630 B1* | 10/2016 | Chowdhury | H04W 8/18 |
| 2004/0254998 A1* | 12/2004 | Horvitz | H04L 67/26 709/206 |
| 2006/0208861 A1 | 9/2006 | Stroupe et al. | |
| 2007/0202884 A1* | 8/2007 | Nykanen | H04L 67/147 455/455 |
| 2007/0214228 A1* | 9/2007 | Horvitz | G06Q 10/107 709/207 |

(Continued)

OTHER PUBLICATIONS

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

(Continued)

*Primary Examiner* — Eric J. Bycer
(74) *Attorney, Agent, or Firm* — Lee & Hayes, P.C.

(57) ABSTRACT

The present disclosure is related to receiving a communication (e.g., direct message, group message, calendar event, task, etc.) on a first device and providing an option to request that a reminder, which is associated with the communication, be presented a second device. For example, the communication may be presented via a mobile client, and the user may request that a reminder be presented via a desktop client (e.g., when the user is at the desktop client).

20 Claims, 4 Drawing Sheets

(56) References Cited

U.S. PATENT DOCUMENTS

| | | | | |
|---|---|---|---|---|
| 2009/0201768 | A1* | 8/2009 | Adams | G06Q 10/1093 368/10 |
| 2011/0231216 | A1* | 9/2011 | Fyke | G06Q 10/1095 705/7.12 |
| 2012/0084793 | A1* | 4/2012 | Reeves | G09G 5/14 719/318 |
| 2013/0244633 | A1* | 9/2013 | Jacobs | H04W 68/00 455/458 |
| 2013/0305322 | A1* | 11/2013 | Raleigh | H04L 12/1435 726/4 |
| 2014/0032706 | A1* | 1/2014 | Kuscher | H04L 67/1095 709/217 |
| 2015/0143281 | A1* | 5/2015 | Mehta | G06Q 10/10 715/781 |
| 2015/0160951 | A1* | 6/2015 | Iyengar | H04L 67/04 715/712 |
| 2016/0182420 | A1* | 6/2016 | Shen | H04L 51/26 709/206 |
| 2016/0349953 | A1* | 12/2016 | Adler | G08B 21/24 |
| 2017/0094638 | A1* | 3/2017 | Borges | H04W 76/25 |
| 2017/0222968 | A1* | 8/2017 | Li | H04L 51/043 |
| 2017/0237693 | A1* | 8/2017 | Shelkovin | H04L 51/04 709/206 |
| 2017/0244798 | A1* | 8/2017 | DeLuca | H04L 67/26 |
| 2018/0091456 | A1* | 3/2018 | Weinberg | H04L 51/24 |
| 2018/0287982 | A1 | 10/2018 | Draeger et al. | |
| 2019/0361694 | A1* | 11/2019 | Gordon | G06F 1/1626 |
| 2020/0177722 | A1* | 6/2020 | Janugani | H04W 4/80 |
| 2020/0389551 | A1* | 12/2020 | Vaughn | H04M 1/72454 |

OTHER PUBLICATIONS

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

Emie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

PCT Search Report and Written Opinion dated Dec. 7, 2022 for PCT application No. PCT/US2022/042634, 13 pages.

* cited by examiner

MOBILE-GENERATED DESKTOP REMINDERS

CROSS REFERENCE TO RELATED APPLICATIONS

This patent application claims priority to Indian Patent Application No. 202121042657 filed Sep. 21, 2021, the entire contents of which are incorporated by referenced herein.

FIELD OF INVENTION

Users of a computing application will often download the application (e.g., copies, versions, instances, iterations, etc.) to multiple devices. For example, the application may be downloaded to a desktop, laptop, tablet, and/or smart phone, and a user account (e.g., the same user account) may be associated with each of the devices. In some cases, the computing application may include different versions that may depend on the device and/or operating system. For example, the computing application may include a desktop version and a mobile version, as well as a web version.

Often, when a user downloads the application to both a first device and a second device (e.g., a desktop version to a first device and a mobile version to a second device), the user will alternate between using the application on the different devices. For example, a desktop version may be used in some instances (e.g., when at a desk or other stationary or semi stationary workstation), and a mobile version may be used in other instances (e.g., when out and about, commuting, or otherwise away from the desktop device). Sometimes a communication (e.g., direct message, group message, calendar event, task, etc.) may be presented to the user via the application on a first device, but the communication may be forgotten or harder to find when the user switches over to the application on the other device. For example, a communication may be presented via the mobile application when the user is away from the desktop computing device, but the user may forget about the communication or have difficulty finding the communication when the user switches back to using the desktop application. Among other things, switching back and forth between the application on different devices may increase the likelihood that a user will miss communications. In addition, it may create inefficiencies while the user searches, on one device, for a communication received via a different device. In some instances, a user may potentially abandon one or more of the versions (e.g., out of frustration).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
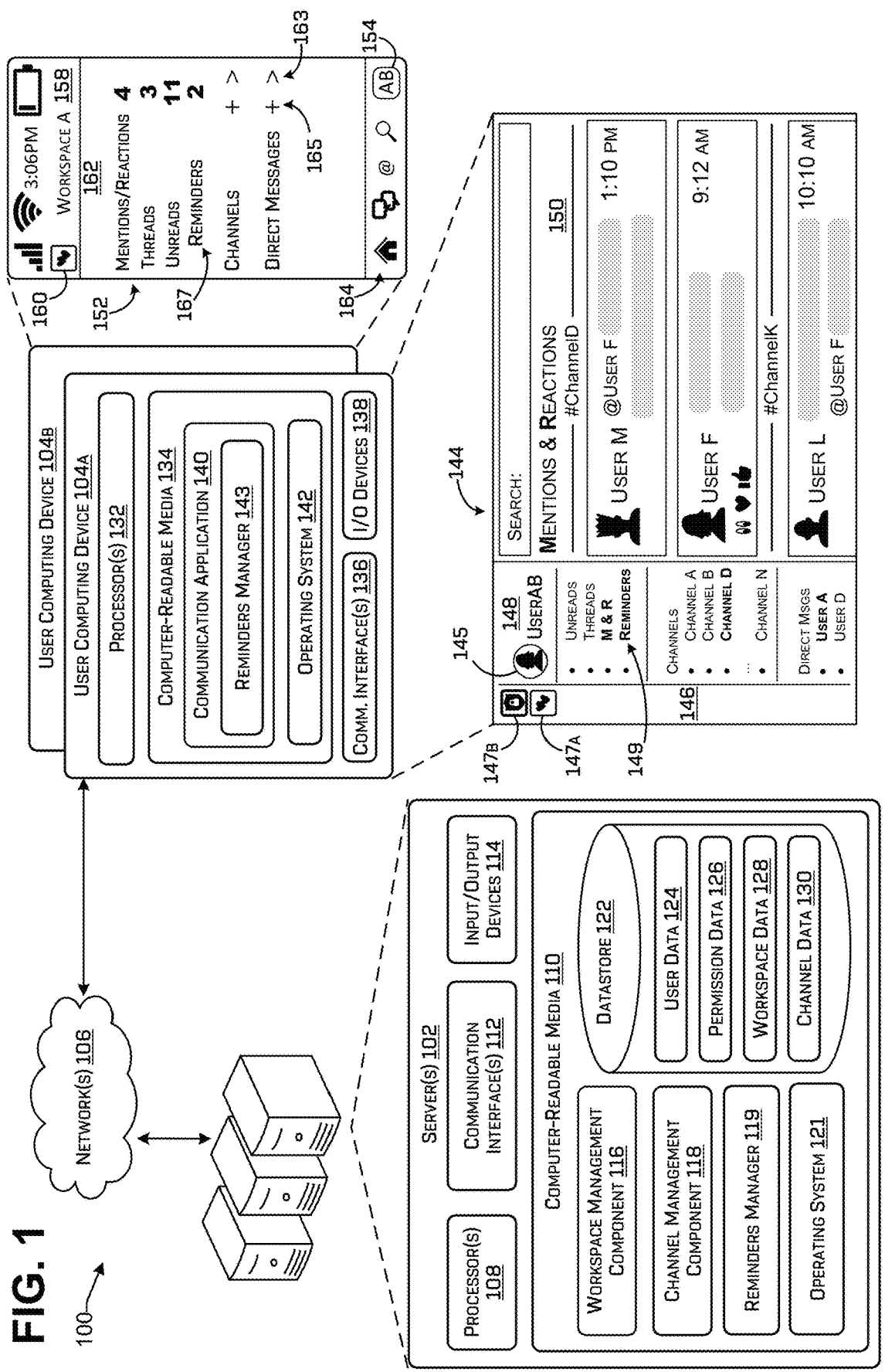
FIG. 1 illustrates a block diagram depicting an example system of computing devices usable to implement example techniques described herein.

As discussed above, in many instances a user may download a computing application to multiple devices (e.g., as different versions, copies, instances, iterations, etc.). For example, a user may download the computing application to both a mobile device and a desktop (or laptop) computing device. In addition, a user often switches back and forth between the devices to interact with (e.g., send/receive communications via) the computing application. The present disclosure is related to receiving a communication (e.g., direct message, group message, calendar event, task, etc.) via the application on a first device (a first client) and providing an option to request that a reminder, which is associated with the communication, be presented via the application on the second device (a second client). For example, the communication may be presented to the user via the mobile application, and the user may request that a reminder associated with the communication be presented via the desktop application (e.g., when the user is at the desktop client). As such, the user may be less likely to miss or forget communications, and the communication may be less likely to be hard to find amongst other communications in the desktop application.

In examples of the present disclosure, a communication platform may provide communication services among networked computing devices. In some instances, when a communication (e.g., group message, direct message, calendar invite, deals, attachments, reactions, mentions, etc.) is sent to (or is accessible by) a user account, then multiple clients associated with the user account may receive the communication and/or notifications associated with the communication. A form of the notification (e.g., placement, accessibility, presentation, appearance, etc.) may depend on a type of client and/or a state of the client. For example, a mobile client may include a lock-screen interface and/or a notifications interface, in which case one or more notifications may be compiled for presentation (e.g., in a stacked presentation). In other examples, a mobile client may include a device home screen interface and/or user interfaces associated with the communication application, in which case one or more notifications may gradually slide in from a top of the mobile client, or otherwise pop up.

In some instances, a user may want to request a reminder in association with the notification. As such, in at least some examples, a reminder menu is presented in association with a notification, and the reminder menu may include a user interface element that provides options for a user to specify or customize settings in association with a reminder. For example, a reminder menu may provide options for a user to specify one or more conditions, such that when the one or more conditions are satisfied, a reminder is presented. A user may want to request a reminder associated with a notification for various reasons. For instance, as described, a user account may be associated the mobile client and with the desktop/laptop client, and a user may receive the notification via the mobile client; however, the user may want to take some action with respect to the communication (e.g., view, open, reply, react, etc.) via the desktop/laptop client. As such, examples of the present disclosure provide techniques for the user to request a reminder in association with the desktop client, such as when the desktop client is active and/or when the user returns to (or is at) the desktop client.

As described, reminders may be useful for notifications. In addition, reminders may be useful for communications (e.g., communications that are opened or viewed on a mobile client), and as such, examples of the present disclosure may provide, in association with a communication, a reminder menu that is usable to request a desktop reminder in association with the communication.

In examples of the present disclosure, a condition for presentation of a reminder may be based on the desktop client (e.g., a state or status associated with the desktop client 204a). For example, presentation of a reminder may be conditioned on a client status, such as a state or change in state of a desktop user computing device and/or the desktop communication application. Desktop state or status, for determining whether a condition is met for presenting a reminder, may be determined in various manners. For example, the state or the change in state may indicate, or be associated with, a presence of a user at the desktop client and/or an active state of the desktop client. In some instances, the condition may include the desktop client waking from a sleeping state, restarting, and/or being turned on, and the state may be detected based on an I/O device receiving an input (e.g., touchscreen input, keyboard input, laptop being opened, etc.) that wakes the desktop client. In some examples, the state may be detected based on a WebSocket or other communication state (e.g., establishing a network connection, such as a WiFi connection). In some examples, the state may be detected based on the communication application being opened, unhidden, launched, and/or logged onto.

Once a reminder has been requested, a record of the request (e.g., including the condition and a link to the associated communication) may be maintained in a database for storing reminder information associated with the user account. As such, when the condition is satisfied (e.g., a status of the desktop client) API calls may be executed on the database to retrieve information related to the reminder for presentation.

Reminders (and/or an indication of a reminder) may be presented in various manners. For example, an indication of a reminder may be presented as a direct message from another account (e.g., a virtual assistant, a reminder bot, etc.). In other examples, an indication of the reminder may be presented in a reminder interface, which may sort reminders based on various criteria and may provide a prioritized presentation of the reminders. That is, in some instances, a plurality of reminders may be provided to a user upon a condition being satisfied (e.g., "when at my desktop" reminders), and the reminders user interface may sort the plurality of reminders in a prioritized manner. In some examples, the reminders may be ranked based on when the requests were received (e.g., reminders that were requested first are ranked higher). In some examples, reminders may be ranked based on the perceived importance of users associated with the reminder (e.g., based on whether a sender is marked as an important contact) or based on whether a channel or direct message associated with the reminder is identified as important (e.g., starred).

In at least some examples, a request to send a reminder when a user is at the desktop client may be automatically generated (e.g., without a user needing to manually request via a reminders menu). For example, a setting may be programmed specifying that, for communications satisfying a condition, a reminder request is automatically sent that requests a reminder when the user is at (e.g., arrives at) his or her desktop. For example, a condition that, if met, generates an automatic desktop reminder may include a communication with an attachment (e.g., any attachment or an attachment exceeding a size threshold), a communication in a specified channel, a communication from a specified sender (e.g., specifically identified senders or senders identified a high importance), a communication associated with a specified third-party application (e.g., an application that may typically involve desktop operations, such as programming, designing, etc.).

In some examples, "when at desktop" timing may be applied to items other than received communications. For example, a user may be away from a desktop client and may want to create a reminder to complete a task when the user is back at the desktop client. As such, a user may create a task item and request, in association with the task item, a reminder to be presented when the user is at the desktop client. In other examples, a user may draft a communication to be sent to one or more other users (e.g., a direct message, a message to a channel, a message in a thread, a task for one or more other users, etc.) and request that presentation of the communication on the other user device(s) be timed based on when the other users are at the other users devices.

Examples of the present disclosure may provide various advantages. For example, based on the desktop reminder(s) a user may be less likely to miss or forget communications, and the communication may be less likely to be hard to find amongst other communications in the desktop application. Among other things, this may reduce search time and reduce computing resources expended on searching, thus improving computing device performance. In addition, desktop reminders may contribute to more robust and organized data (e.g., communications that include an additional layer of organization based on the desktop reminders), which can also contribute to improved computing performance. These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

FIG. 1 illustrates an example environment 100 for performing techniques described herein. In at least one example, the example environment 100 may be associated with a communication platform that may leverage a network-based computing system to enable users of the communication platform to exchange data. In at least one example, the communication platform may be "group-based" such that the platform, and associated systems, communication channels, messages, and/or virtual spaces, have security (that may be defined by permissions) to limit access to a defined group of users. In some examples, such groups of users may be defined by group identifiers, as described above, which may be associated with common access credentials, domains, or the like. In some examples, the communication platform may be a hub, offering a secure and private virtual space to enable users to chat, meet, call, collaborate, transfer files or other data, or otherwise communicate between or among each other. As described above, each group may be associated with a workspace, enabling users associated with the group to chat, meet, call, collaborate, transfer files or other data, or otherwise communicate between or among each other in a secure and private virtual space. In some examples, members of a group, and thus workspace, may be associated with a same organization. In some examples, members of a group, and thus workspace, may be associated with different organizations (e.g., entities with different organization identifiers).

In at least one example, the example environment 100 may include one or more server computing devices (or "server(s)") 102. In at least one example, the server(s) 102 may include one or more servers or other types of computing devices that may be embodied in any number of ways. For example, in the example of a server, the functional components and data may be implemented on a single server, a cluster of servers, a server farm or data center, a cloud-hosted computing service, a cloud-hosted storage service, and so forth, although other computer architectures may additionally or alternatively be used.

In at least one example, the server(s) 102 may communicate with one or more user computing devices 104a and/or 104b (may also be referred to as user computing device(s) 104) via one or more network(s) 106. That is, the server(s) 102 and the user computing device(s) 104 may transmit, receive, and/or store data (e.g., content, information, or the like) using the network(s) 106, as described herein. The user computing device(s) 104 may be any suitable type of computing device, e.g., portable, semi-portable, semi-stationary, or stationary. Some examples of the user computing device(s) 104 may include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While FIG. 1 shows the user computing device 104a and the user computing device 104b, in practice, the example environment 100 may include multiple (e.g., tens of, hundreds of, thousands of, millions of) user computing devices.

In at least one example, user computing devices, such as the user computing device(s) 104, may be operable by users to, among other things, access communication services via the communication platform. A user may be an individual, a group of individuals, an employer, an enterprise, an organization, or the like. In some examples, a user (e.g., the same user) may use multiple computing devices to access communication services via the communication platform. For example, a user may use both the user computing device 104a and the user computing device 104b to access the communication services (e.g., the user may switch or alternate between the user computing devices 104 when accessing the communication services).

The network(s) 106 may include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy® (BLE), Near Field Communication (NFC), a wired network, or any other such network, or any combination thereof. Components used for such communications may depend at least in part upon the type of network, the environment selected, or both. Protocols for communicating over such network(s) 106 are well known and are not discussed herein in detail.

In at least one example, the server(s) 102 may include one or more processors 108, computer-readable media 110, one or more communication interfaces 112, and input/output devices 114.

In at least one example, each processor of the processor(s) 108 may be a single processing unit or multiple processing units and may include single or multiple computing units or multiple processing cores. The processor(s) 108 may be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 may be one or more hardware processors and/or logic circuits of any suitable type specifically programmed or configured to execute the algorithms and processes described herein. The processor(s) 108 may be configured to fetch and execute computer-readable instructions stored in the computer-readable media, which may program the processor(s) to perform the functions described herein.

The computer-readable media 110 may include volatile and nonvolatile memory and/or removable and non-removable media implemented in any type of technology for storage of data, such as computer-readable instructions, data structures, program modules, or other data. Such computer-readable media 110 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that may be used to store the desired data and that may be accessed by a computing device. Depending on the configuration of the server(s) 102, the computer-readable media 110 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 110 may be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media may optionally include a workspace management component 116, a channel management component 118, reminders manager 119, an operating system 121, and a datastore 122.

In at least one example, the workspace management component 116 may manage workspaces. That is, in at least one example, the communication platform may be partitioned into different workspaces, which may be associated with different groups of users, as described above. As described above, each workspace may be associated with a group identifier and one or more user accounts may be mapped to, or otherwise associated with, the group identifier. User(s) corresponding to such user account(s) may be "members" of the group.

In some examples, the workspace management component 116 may manage workspace membership. That is, the workspace management component 116 may receive requests to associate users with individual workspaces and the workspace management component 116 may associate user accounts associated with such users with group identifiers associated with the individual workspaces. For example, responsive to receiving a request to add a user to a workspace, the workspace management component 116 may associate a user account of the user with a group identifier of the workspace. The workspace management component 116 may disassociate user accounts and group identifiers, for example, when a user is removed from a workspace.

In at least one example, the channel management component 118 may manage communication channels. As described above, in at least one example, the communication platform may be a channel-based messaging platform, that in some examples, may be usable by group(s) of users. Users of the communication platform may communicate with other users via communication channels. A communication channel, or virtual space, may be a data route used for exchanging data between and among systems and devices associated with the communication platform. In at least one example, the channel management component 118 may establish a communication channel between and among various user computing devices, allowing the user computing devices to communicate and share data between and among each other. In at least one example, the channel management component 118 may manage such communications and/or sharing of data. In some examples, data associated with a communication channel may be presented via a user interface. In at least one example, the channel management component 118 may interact with the workspace management component 116 to manage the generation, presentation, and/or updating of user interfaces. Additional details of operations that may be performed by the channel management component 118 are described below.

In at least one example, the reminders manager 119 may receive requests (e.g., from the user computing device(s) 104) to provide a reminder associated with the communication services. For example, when executing operations associated with communication services, the server(s) 102 may provide to the user computing device 104*b* a communication. In addition, the user computing device 104*b* may request that a reminder associated with the communication be provided upon the occurrence of a condition (e.g., time-based condition, scheduled condition, when the user switches to (or is at) the computing device 104*a*, etc.). The reminders manager 119 may, among other things, receive and store the reminders request, determine when a condition has been met, and help facilitate presentation the reminder upon satisfaction of the condition.

In at least one example, the operating system 121 may manage the processor(s) 108, computer-readable media 110, hardware, software, etc. of the server(s) 102.

In at least one example, the datastore 122 may be configured to store data that is accessible, manageable, and updatable. In some examples, the datastore 122 may be integrated with the server(s) 102, as shown in FIG. 1. In other examples, the datastore 122 may be located remotely from the server(s) 102 and may be accessible to the server(s) 102 and/or user device(s), such as the user computing device(s) 104. The datastore 122 may comprise multiple databases, which may include user data 124, permission data 126, workspace data 128, and channel data 130. Additional or alternative data may be stored in the data store and/or one or more other data stores.

In at least one example, the user data 124 may store data associated with users of the communication platform. In at least one example, the user data 124 may store data in user profiles (which may also be referred to as "user accounts"), which may store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j_doe), a password, a time zone, a status (e.g., user status such as active, away, inactive, etc.), a token, and the like.

In some examples, a user may create a user account or profile that is associated with multiple clients. For example, the user account may be used in association with different copies or versions of a communication application downloaded to multiple computing devices (e.g., desktops, laptops, mobile devices, tablets, etc.). In some examples, user data 124 is reconciled among all of the clients. User data 124 may include other information, as well. For example, user data 124 may store a listing (e.g., table) of reminders requested in association with the user account. The listing may include, for example, information related to the subject of the reminder (e.g., a communication for which the reminder was requested) and condition information including a condition-based setting that, when satisfied, indicates the reminder should be provided. For example, if the reminder has been requested when a user is at his or her desktop client, the data stored in association with the reminder (e.g., in the datastore, table, etc.) may indicate as such.

In at least one example, the permission data 126 may store data associated with permissions of individual users of the communication platform. In some examples, permissions may be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user may be mapped to, or otherwise associated with, an account or profile associated with the user data 124. In some examples, permissions may indicate which users may communicate directly with other users, which channels a user is permitted to access, restrictions on individual channels, which workspaces the user is permitted to access, restrictions on individual workspaces, and the like. In at least one example, the permissions may support the communication platform by maintaining security for limiting access to a defined group of users. In some examples, such users may be defined by common access credentials, group identifiers, or the like, as described above.

In at least one example, the workspace data 128 may store data associated with individual workspaces. As described above, the communication platform may be partitioned into workspaces associated with groups of users. In at least one example, a group identifier may be associated with a workspace. In at least one example, the group identifier may indicate a physical address in the workspace data 128 where data related to the corresponding workspace is stored. In at least one example, data associated with workspace permissions may be stored in association with the group identifier, data identifying users associated with the workspace may be stored in association with the group identifier, data associated with messages and/or other content associated with the workspace may be stored in association with the group identifier, data associated with communication channels associated with the workspace may be stored in association with the group identifier, and the like. In some examples, workspaces may be associated with one or more organization identifiers, which may be associated with organizations or other entities associated with the communication platform. In some examples, such data may be mapped to, or otherwise associated with, other types of data in the datastore 122 (e.g., the user data 124, the permission data 126, the channel data 130, etc.).

In at least one example, the channel data 130 may store data associated with individual communication channels. In at least one example, the channel management component 118 may establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 may be partitioned into discrete items of data that may be accessed and managed individually (e.g., data shards). Data shards may simplify many technical tasks, such as data retention, unfurling (e.g., detecting that message contents include a link, crawling the link's metadata, and determining a uniform summary of the metadata), and integration settings. In some examples, data shards may be associated with organizations, groups (e.g., workspaces), communication channels, users, or the like.

In some examples, individual organizations may be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself may be the owner of the database shard and has control over where and how the related data is stored. In some examples, a database shard may store data related to two or more organizations (e.g., as in a shared channel).

In some examples, individual groups may be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself may be the owner of the database shard and has control over where and how the related data is stored.

In some examples, a communication channel may be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization may be the owner of the database shard and may control where and how the related data is stored.

In some examples, individual users may be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself may be the owner of the database shard and has control over where and how the related data is stored.

The communication interface(s) 112 may include one or more interfaces and hardware components for enabling communication with various other devices (e.g., the user computing device(s) 104), such as over the network(s) 106 or directly. In some examples, the communication interface(s) 112 may facilitate communication via Websockets, Application Programming Interfaces (APIs) (e.g., using API calls), HyperText Transfer Protocols (HTTPs), etc.

The server(s) 102 may further be equipped with various input/output devices 114 (e.g., I/O devices). Such I/O devices 114 may include a display, various user interface controls (e.g., buttons, joystick, keyboard, mouse, touch screen, etc.), audio speakers, connection ports and so forth.

In at least one example, the user computing device(s) 104 may include one or more processors 132, computer-readable media 134, one or more communication interfaces 136, and input/output devices 138 (I/O devices).

In at least one example, each processor of the processor(s) 132 may be a single processing unit or multiple processing units, and may include single or multiple computing units or multiple processing cores. The processor(s) 132 may comprise any of the types of processors described above with reference to the processor(s) 108 and may be the same as or different than the processor(s) 108.

The computer-readable media 134 may comprise any of the types of computer-readable media 134 described above with reference to the computer-readable media 110 and may be the same as or different than the computer-readable media 110. Functional components stored in the computer-readable media may optionally include a communication application 140 (e.g., for interacting with the server(s) 102); and an operating system 142.

In at least one example, the communication application 140 may be a mobile application, a web application, or a desktop application, which may be provided by the communication platform or which may be an otherwise dedicated application. In some examples, individual user computing devices associated with the environment 100 may have an instance or versioned instance of the communication application 140, which may be downloaded from an application store, accessible via the Internet, or otherwise executable by the processor(s) 132 to perform operations as described herein. That is, the communication application 140 may be an access point, enabling the user computing device(s) 104 to interact with the server(s) 102 to access and/or use communication services available via the communication platform. In at least one example, the communication application 140 may facilitate the exchange of data between and among various other user computing devices, for example via the server(s) 102. In at least one example, the communication application 140 may present user interfaces, as described herein. In at least one example, a user may interact with the user interfaces via touch input, keyboard input, mouse input, spoken input, or any other type of input (e.g., using the I/O devices 138).

The communication application 140 may include various functional components, and in at least one example, the application 140 includes a reminders manager 143. In some examples, the reminders manager 143 may perform one or more operations that are similar to the reminders manager 119. In at least some examples, the reminders manager 143 may provide (e.g., in association with a communication) one or more options for requesting and/or scheduling a reminder. For example, the reminders manager 143 may provide an option to request a reminder when a condition is satisfied, such as, but not limited to, a time-based condition (e.g., in 30 minutes or at a specified time), a location-based condition (e.g., when the client is determined to be at a location), a client-status-based condition (e.g., when a desktop client is active), and the like. In at least some examples, the reminders manager 143 may receive and memorialize a reminder request input by a user. For example, the reminders manager 143 may store a record of the reminder request locally on the client and/or may communicate the reminder request to the server(s) 102 (e.g., to the reminders manager 119). In some examples, the reminders manager 143 may determine when a condition associated with a reminder has been satisfied and/or receive an indication (e.g., alert or notification) from another component that the condition has been satisfied. In at least some examples, the reminders manager 143 may (e.g., upon a condition being satisfied, if specified) present a reminder via the user computing device(s) (e.g., in the context of the communication application 140).

Non-limiting examples of user interfaces 144 and 152 are shown in FIG. 1. The user interfaces 144 and 152 may present information associated with a user account (e.g., UserAB as indicated by the user profile indicators 145 and 154). Although FIG. 1 depicts an example in which the user interfaces 144 and 152 present information associated with the same user account, in other examples, the user interfaces 144 and 152 may present information associated with different user accounts. For example, the user interfaces 144 and 152 may present information associated with different user accounts that exchange information via the communication services provided by the server(s) 102.

As illustrated in FIG. 1, the user interface 144 can present data associated with one or more channels and, in some examples, one or more workspaces. That is, in some examples, the user interface 144 can enable a user to access multiple workspaces. In some examples, the user interface 144 can include a first section 146 (e.g., which can be a portion, pane, or other partitioned unit of the user interface 144) that includes user interface element(s) associated with workspace(s) with which the user (e.g., account of the user) is associated. Two user interface elements are illustrated in FIG. 1, a first user interface element 147a representing a first workspace and a second user interface element 147b representing a second workspace. As described above, such workspaces can be associated with different domains. In some examples, a user can interact with the first user interface element 147a or the second user interface element 147b to access the corresponding workspace. In some examples, a user can be prompted to provide a credential to authenticate with the corresponding workspace. While two user interface elements are illustrated, any number of user interface elements can be presented via the first section 146, which can be associated with one or more domains.

In some examples, the user interface 144 may include a second section 148 (e.g., which can be a portion, pane, or other partitioned unit of the user interface 144) that includes user interface element(s) representing data associated with the workspace(s) with which the user (e.g., account of the user) is associated. In some examples, user interface element(s) presented via the second section 148 can represent virtual space(s) with which the user has access via a particular workspace or multiple workspaces. In some examples, the second section 148 may include user interface elements indicating one or more reminders related to data associated with the workspace. For example, the second section 148 may include a user interface element 149 that, when selected, presents a reminder (e.g., generated by a bot, virtual assistant, the reminders manager 143, etc.). In some examples, a reminders interface element may be presented under a direct messages section (e.g., as a direct message from a bot).

In at least one example, the user interface 144 can include a third section 150 (e.g., which can be a portion, pane, or other partitioned unit of the user interface 144) that can be associated with a data feed (or "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the third section 150 can be associated with the same or different workspaces. That is, in some examples, the third section 150 can present data associated with the same or different workspaces via an integrated feed. In some examples, the data can be organized and/or is sortable by workspace, time (e.g., when associated data is posted or an associated operation is otherwise performed), type of action, channel, user, or the like. In some examples, such data can be associated with an indication of which user (e.g., member of the channel) posted the message and/or performed an action. In examples where the third section 150 presents data associated with multiple workspaces, at least some data can be associated with an indication of which workspace the data is associated with. In some examples, the third section 150 may, when the user interface element 149 is selected, present data associated with one or more reminders.

Figure 4:
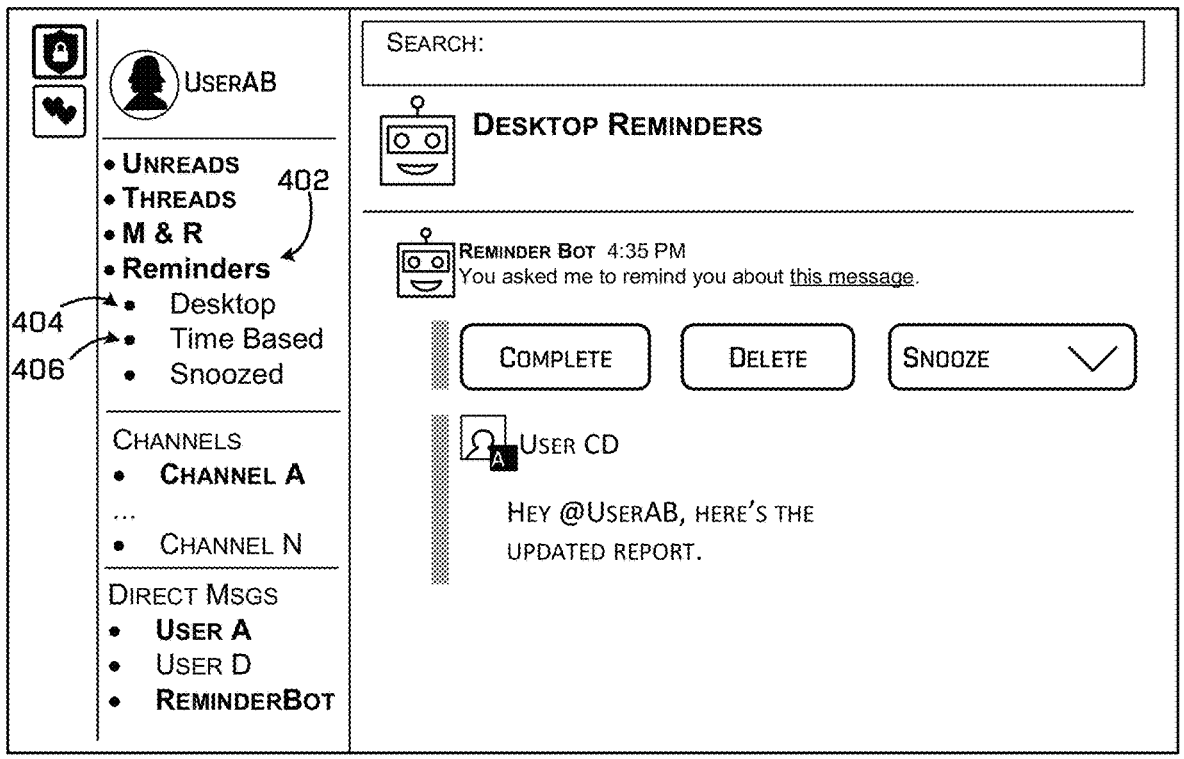
FIG. 4 illustrates a user interface related to reminders, as described herein.

In at least one example, the first section 146, the second section 148, and the third section 150, in combination, can be associated with a "group-based communication user interface" from which a user can interact with the communication platform. Additional details associated with the user interface 144 are described below with reference to FIGS. 2 and 4.

As illustrated in FIG. 1, the user interface 152 may present data associated with one or more communication channels and, in some examples, one or more workspaces. That is, in some examples, the user interface 152 may integrate data from multiple workspaces into a single user interface so that the user (e.g., of the user computing device 104b) may access and/or interact with data associated with the multiple workspaces that he or she is associated with and/or otherwise communicate with other users associated with the multiple workspaces. For example, a first region or pane 158 (e.g., header region) may include indicator(s) (e.g., user interface element(s) or object(s)) associated with workspace(s) with which the user (e.g., account of the user) is associated. In some examples, the first region 158 may include a workspace identifier 160 (e.g., may be similar to the indicator 147a) that, when selected, opens a sidebar or other user interface (e.g., other pane or window) that allows selection of, or addition of, a different workspace (not explicitly shown in FIG. 1).

In examples, the user interface 152 may include a second region 162, or pane, that includes indicator(s) (e.g., user interface element(s) or object(s)) representing data associated with the workspace(s) (e.g., Workspace A in FIG. 1) with which the user (e.g., account of the user) is associated. For example, the second region 162 may include indicators related to mentions/reactions (e.g., messages shared among a group that include a reaction to a message posted by the UserAB or that mention UserAB); indicators related to communication threads associated with a user account (e.g., threads on which UserAB is included or to which UserAB has access); unread communications shared with a user account (e.g., to which UserAB has access); channels of which a user account is a member (e.g., channels of which UserAB is a member); direct message exchanges with other users; etc. In at least some examples, the second region 162 may include user interface elements (e.g., 163) that, when selected, present one or more sub-items beneath a respective category (e.g., "channels" category or "direct messages" category), such as by expanding a listing under the category. In at least some examples, the second region 162 may include user interface elements (e.g., 165) that, when selected, present another user interface for searching under the category and/or creating a new item under the category. In addition, in some examples, the second region 162 may include user interface elements indicating one or more reminders related to data associated with the workspace. For example, the second section 162 may include a user interface element 167 that, when selected, presents a reminder (e.g., generated by a bot, virtual assistant, the reminders manager 143, etc.) and/or navigates to a different user interface presenting multiple reminders.

In at least some examples, the user interface 152 may include a third region 164 (e.g., footer region) with other indicators (e.g., user interface element(s) or object(s)) that are selectable to navigate to a different user interface, pane, or window. In some examples, the indicators presented in the third region 164 may be persistently displayed in the third region 164 when the user computing device 104 navigates from one user interface to another user interface (e.g., when the content in the region 158 and/or 162 changes). For example, the third region 164 may include a home-screen indicator that, when selected, navigates to a home screen (e.g., the user interface 152). Further, in some examples, the third region 164 may include a direct message indicator that, when selected, navigates to a window displaying one or more direct message threads, as well as a mentions/reactions indicator that, when selected, navigates to a window displaying communications that mention the UserAB and/or react to a communication posted by the UserAB. The third region 164 may include one or more other selectable indicators, such as a search element and the profile indicator 154. Additional details associated with the user interface 144 are described below with reference to FIGS. 2 and 3.

In at least one example, the operating system 142 may manage the processor(s) 132, computer-readable media 134, hardware, software, etc. of the server(s) 102.

The communication interface(s) 136 may include one or more interfaces and hardware components for enabling communication with various other devices (e.g., the user computing device(s) 104), such as over the network(s) 106 or directly. In some examples, the communication interface(s) 136 may facilitate communication via Websockets, APIs (e.g., using API calls), HTTPs, etc.

The user computing device(s) 104 may further be equipped with various input/output devices 138 (e.g., I/O devices). Such I/O devices 138 may include a display, various user interface controls (e.g., buttons, joystick, keyboard, mouse, touch screen, etc.), audio speakers, connection ports and so forth.

While techniques described herein are described as being performed by the workspace management component 116, the channel management component 118, the reminders managers 119 and/or 143, and the communication application 140, techniques described herein may be performed by any other component, or combination of components, which may be associated with the server(s) 102, the user computing device(s) 104, or a combination thereof.

Figure 2:
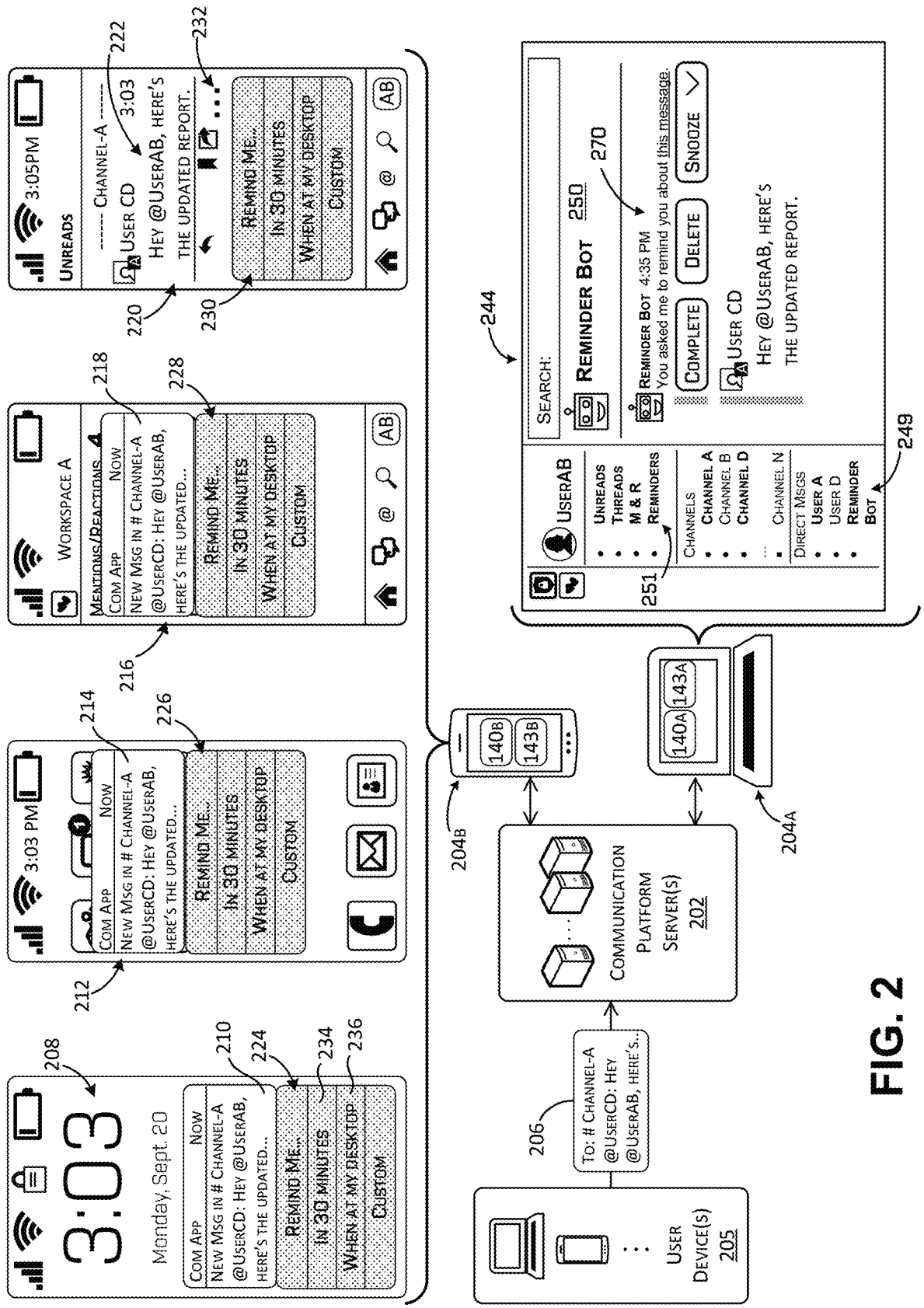
FIG. 2 illustrates a network of user computing devices, some of which include user interfaces associated with reminders, as described herein.

Referring now to FIG. 2, FIG. 2 illustrates, among other things, additional details associated with the user interfaces 144 and 152 (as well as other user interfaces), reminders, and other aspects described above with reference to FIG. 1. FIG. 2 illustrates an example in which a user account (UserAB) is associated with two clients 204a and 204b, where the clients may include the user computing device 104a and the user computing device 104b and/or the communications application 140a (e.g., an instance of the communication application 140 on the user computing device 104a) and the communications application 140b (e.g., an instance of the communication application 140 on the user computing device 104b). That is, the client 204a may include the user computing device 104a and/or the communication application 140a being executed by the user computing device 104a, and the client 204b may include the user computing device 104b and/or the communication application 140b being executed by the user computing device 104b. As described above, in some instances, a user may download a computing application to multiple devices (e.g., as different versions, copies, instances, iterations, etc. of the computing application). For example, a user may download the communication application 140a to the user computing device 104a (e.g., desktop or laptop) and download the communication application 140b to the user computing device 104b (e.g., mobile device or tablet). In addition, the user may switch back and forth between the devices 104a and 104b to interact with (e.g., send/receive communications via) the computing applications and with the communication services provided by the communication platform server(s) 202.

FIG. 2 illustrates that one or more user devices 205 may leverage the communication platform server(s) 202 to provide a communication 206. In FIG. 2, the communication 206 is illustrated to include a message (e.g., group message) that is associated with a channel (e.g., Channel-A). Various other types of communications may be provided from the user devices 205, such as direct messages, calendar invites or other meeting requests, tasks, deals, attachments, reactions, mentions, emojis, etc. In some examples, a user account (e.g., the same user account) associated with the first client and the second client has permission to access (e.g., receive and/or interact with) the communication 206. In some examples, the communication 206 (e.g., a copy of the communication 206) may be provided to the first client 204a and the second client 204b.

In at least some examples, the first client 204a and the second client 204b may present one or more notifications associated with the communication 206, and a form of the notification (e.g., placement, accessibility, presentation, appearance, etc.) may depend on a state of the client. For example, the client 204b may include an interface 208, which could represent a lock-screen interface (e.g., interface presented when the client 204b is locked state) or a notifications interface (e.g., interface presented when a user navigates to a notification center, such as by swiping down). In the example provided by the interface 208, a notification may include an interface element 210 that identifies one or more of the communication application, a time associated with the communication 206, and at least a portion of the content of the communication 206. In addition, FIG. 2 illustrates another example state of the client 204b, including a device home screen interface 212, which may be presented when the client 204b is unlocked and presenting applications executable by, or downloaded to, the user computing device 104b. In the example provided by the interface 212, a notification may include an interface element 214 that is similar to the interface element 210 and that may float down from the top of the interface 210, gradually appear as an overlay or pop up, or otherwise be presented across the home screen or application. In addition, FIG. 2 illustrates another example state of the client 204b, including a user interface 216 associated with the communication application 140b (e.g., similar to the user interface 152 described with respect to FIG. 1). In the example provided by the interface 216, a notification may include an interface element 218 that is similar to the interface element 214.

FIG. 2 illustrates another example related to the communication 206, including a user interface 220 that may present content 222 associated with the communication 206. For example, the client 204b may present the user interface 220 and the content 222 in response to a selection of a portion of one of the notification interface elements 210, 214, or 218 and/or in response to a selection of an interface element in the user interface 216 (e.g., selection of the "unreads" folder interface element or the "# channel-a" folder interface element). The user interface 220 may include elements for interacting with the content 222, such as a reply interface element, tag interface element, forward interface element, and a menu expansion interface element.

At least some examples of the present disclosure include presenting a reminder menu in association with a notification and/or a communication (e.g., direct message, group message, task, calendar event, deal, etc.). As described in this disclosure, a reminder menu includes a user interface element that provides options for a user to specify or customize settings in association with a reminder. For example, a reminder menu may provide options for a user to specify one or more conditions, such that when the one or more conditions are satisfied, a reminder is presented. FIG. 2 illustrates various examples in which a reminder menu 224, 226, and 228 is presented in association with the notifications 210, 214, and 218 (respectively). The reminder menus 224, 226, and 228 may be presented in response to various user input, such as a touch input (e.g., touch and hold). In another example, a reminder menu 230 may be invoked via a touch and hold input and/or by expanding menu options via the menu-expansion interface element 232.

A user may want to request a reminder associated with a communication for various reasons. For instance, as described, a user account may be associated the mobile client 204b and with the desktop/laptop 204a, and a user may receive the communication via the mobile client 204b; however, the user may want to take some action with respect to the communication via the desktop/laptop client 204a. As such, it may be useful to request a reminder in association with the desktop client 204a, such as when the desktop client 204a is active and/or when the user returns to (or is at) the desktop client 204a.

In examples of the present disclosure, a condition for presentation of a reminder may be based on the desktop client 204a (e.g., a state or status associated with the desktop client 204a). For example, presentation of a reminder may be conditioned on a client status, such as a state or change in state of a desktop user computing device and/or the desktop communication application (e.g., 140a). In at least some examples, reminder presentation may be also (or alternatively) be conditioned on a client location, such as whether a location of the client 204b satisfies a location-based threshold (e.g., within a threshold distance of a location). As such, in some examples, the reminder menu (e.g., 224, 226, 228, and 230) may include a reminder-option interface element 236 for requesting that a reminder be presented on the desktop client 204a (e.g., when a state or status of the desktop client 204a satisfies a condition). In further examples, conditions for reminder presentation may include various other criteria, such as time-based conditions 234 (e.g., in 30 minute, in 1 hour, tomorrow, next week, etc.) or calendar-based conditions (e.g., on a specified date).

In some examples, when a reminder is requested (e.g., by selection of the interface element 236), the reminders manager 143b may record/store the requested reminder and/or communicate the reminder request to the server-side reminders manager 119. In addition, the reminder request may be stored (e.g., in the datastore 122,) together with related information, such as the condition on which reminder presentation is based (e.g., status of desktop client 204a) and the related communication (e.g., communication 206 or a link to the communication 206).

Figure 3:
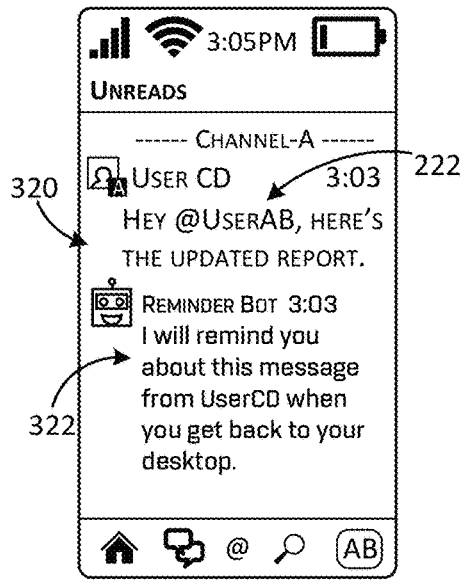
FIG. 3 illustrates a user interface presenting information confirming a reminder request, as described herein.

Referring briefly to FIG. 3, FIG. 3 presents an example of a user interface 320 according to one or more examples. In at least some examples, when a reminder request has been received from a user account, a confirmatory communication is sent to the user account to confirm that the reminder will be provided when the user is at his or her desktop client. For example, the user interface 320 presents a portion of a thread associated with the content 222, and the thread includes content 322 associated with the confirmatory communication (e.g., from the reminder bot).

Referring back to FIG. 2, in at least some examples, the reminders manager 143a of the desktop client 204a may include some identification (e.g., a list, setting, etc.) of one or more criteria on which reminder presentation is conditioned. For example, the reminders manager 143a may include information indicating that reminder presentation may be based on a state of the desktop client 204a. As such, when the state indicated by the condition arises (e.g., is determined by the reminders manager 143a), the reminders manager 143a may execute an API call to the server-side reminders manager 119 to determine whether any requested reminders conditioned on the detected status are stored in the database. If so, the reminders manager 143a may receive, from the server-side reminders manager 119, an identification of the reminders to be presented, and the reminders may be presented via the user interface 244.

Reminders (and/or an indication of a reminder) may be presented in the user interface 244 in various manners. For example, the user interface 244 may indicate, in a direct message interface element 249 (e.g., a direct message from a reminder bot, such as a virtual personal assistant), that an unread communication (e.g., a communication including a reminder), has been received. In another example, the user interface 244 may indicate, in a grouped communications interface element 251, that a reminder has been received. In addition, when the interface element 249 and/or 251 is selected, the region 250 may display a reminder 270 associated with the communication 206. Reminders and indications associated with reminders may be presented in other ways as well. For example, referring briefly to FIG. 4, a user interface 400 is depicted in accordance with some examples. In some instances, the user interface 400 may include a reminders interface element 402, which may help to sort reminders based on various criteria. For example, in FIG. 4, the reminders interface element 402 may provide a sorted rendering based on a condition specified for reminder presentation. In some examples, the reminder interface element 402 may include a desktop indicator 404 that, when selected, presents one or more desktop reminders that were conditioned on a status of the desktop (e.g., when the desktop is active and/or when the user is perceived to be at the desktop). The reminder interface element 402 may include other indicators, such as a time-based indicator 406, which when selected, may present one or more reminders that were conditioned to be presented based on a time-based scheduling (e.g., in 30 minutes). In other examples, the reminders interface element provide a sorted presentation based on other criteria, such as channels (e.g., reminders associated with a channel) or user accounts (e.g., reminders associated with communications that are from or that mention or that are reacted to by a user account).

Referring to FIG. 2, the reminders manager 143b may determine that a condition has been met to present a "when at my desktop" reminder based on various criteria associated with a desktop state or a change in desktop state. In some examples, the state or the change in state may indicate, or be associated with, a presence of a user at the desktop client 204a and/or an active state of the desktop client 204a. For example, the condition may include the desktop client 204a waking from a sleeping state, restarting, and/or being turned on. The state may be detected based on an I/O device receiving an input (e.g., touchscreen input, keyboard input, laptop being opened, etc.) that wakes the desktop client 204a. In some examples, the state may be detected based on a WebSocket or other communication state (e.g., establishing a network connection, such as a Wi-Fi connection). In some examples, the state may be detected based on the communication application 140a being opened, unhidden, launched, and/or logged onto. As indicated, the reminders manager 143a may monitor one or more of these states and, when a condition is met, perform an API call to the server(s) (e.g., to the server(s) and/or reminder manager 119 in FIG. 1) to determine whether any reminders have been requested to be presented on the desktop client 204a upon the condition being met (e.g., when the user is at the desktop).

In other examples, presentation of a reminder may be based on other information that may suggest a user is at his or her desktop. For example, the reminder manager 143a may receive information indicating that the mobile client 204b is proximate the desktop client 204a (e.g., via a Bluetooth® connection or other wireless connection or via a wired connection), and a reminder may be presented on the desktop based on the mobile client 204b being proximate the desktop client 204a. In some examples, location of the desktop client and/or the mobile client may be based on Bluetooth® connection, GPS data, RFID data, barcode (e.g., QR) data, or near field communication (NFC) data.

FIG. 2 provides one or more examples in which a desktop reminder can be manually requested (e.g., by selecting the interface element 236). In other examples, a request to send a reminder when a user is at the desktop client may be automatically generated. For example, a setting may be programmed specifying that, for communications satisfying a condition, a reminder request is automatically sent that requests a reminder when the user is at (e.g., arrives at) his or her desktop. For example, a condition that, if met, generates an automatic desktop reminder may include a communication with an attachment (e.g., any attachment or an attachment exceeding a size threshold), a communication in a specified channel, a communication from a specified sender (e.g., specifically identified senders or senders identified a high importance), a communication associated with a specified third-party application (e.g., an application that may typically involve desktop operations, such as programming, designing, etc.). In some embodiments, a reminder request may be automatically generated by a workflow when a particular event is triggered. In some embodiments, a reminder request may be automatically generated by an application when a particular event has occurred.

In additional examples, a user may request that multiple reminders be provided when the user is back at the desktop client. As such, examples of the present disclosure may rank the reminders based on various criteria, such as to try and present more important reminders first. In some examples, the reminders may be ranked based on when the requests were received (e.g., reminders that were requested first are ranked higher). In some examples, reminders may be ranked based on the perceived importance of users associated with the reminder (e.g., based on whether a sender is marked as an important contact) or based on whether a channel or direct message associated with the reminder is identified as important (e.g., starred).

FIG. 2 provides one or more examples in which a desktop reminder (e.g., provide reminder when at my desktop) is associated with a communication from a user. In some examples, "when at desktop" timing may be applied to other items. For example, a user may be away from a desktop client and may want to create a reminder to complete a task when the user is at the desktop client. As such, using the communication application 140b, a user may create a new communication (e.g., a task or other communication with some action item that is assigned to, or for completion by, the user account) and request, in association with the task item, a reminder to be presented when the user is at the desktop client 204a. In other examples, a user may draft a communication to be sent to one or more other users (e.g., a direct message, a message to a channel, a message in a thread, a task for one or more other users, etc.) and request that presentation of the communication on the other user device(s) be timed based on when the other users are at the other users devices.

Figure 5:
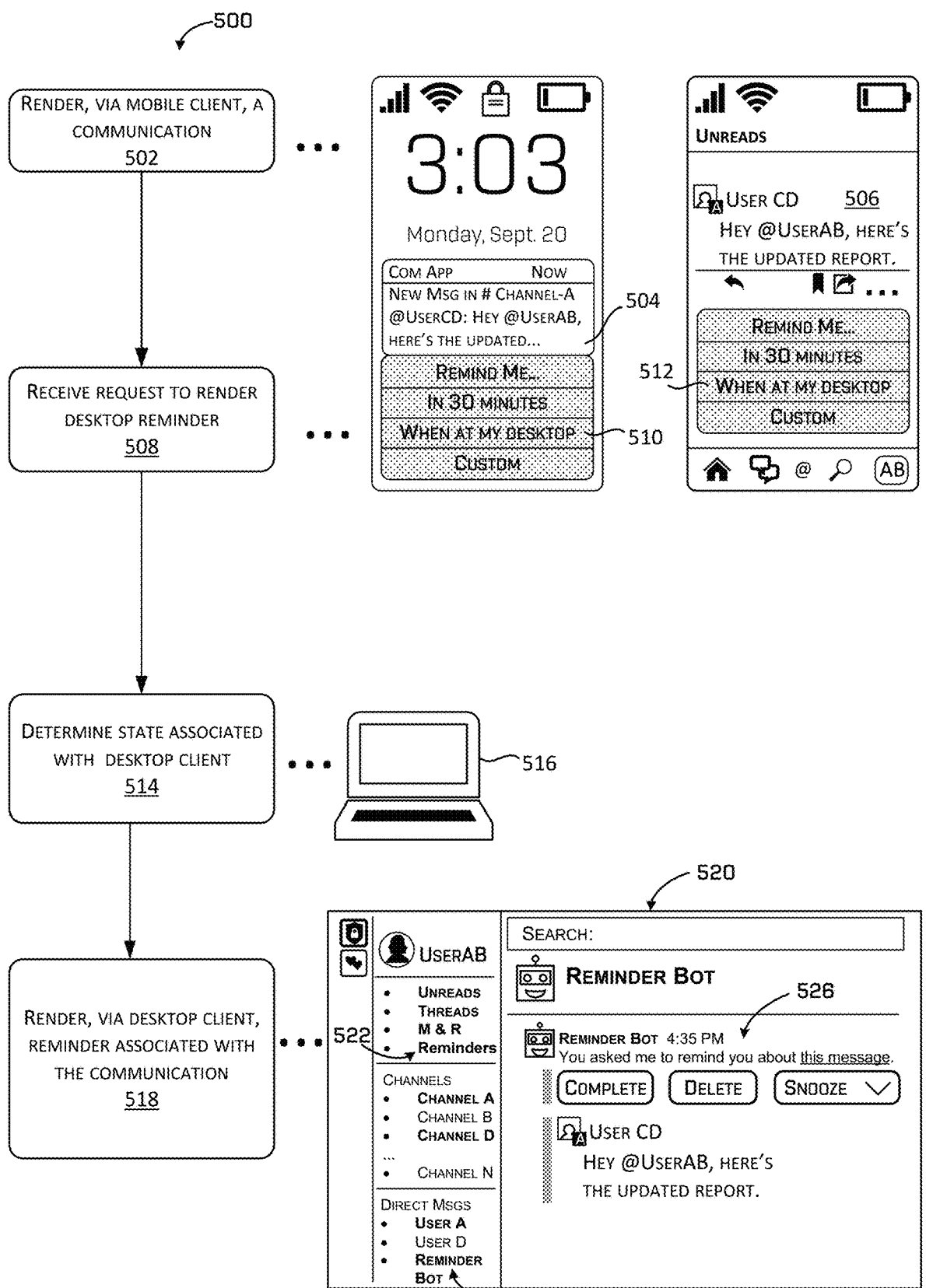
FIG. 5 includes a flow diagram illustrating an example process for presenting desktop reminders, as described herein.

Referring to FIG. 5, an example process 500 is illustrated for requesting and providing desktop reminders. In some instances, some or all of process 500 may be performed by one or more components in the environment 100 or one or more components discussed with respect to FIGS. 1, 2, 3, and/or 4. By way of example and not limitation, the communication platform referred to in process 500 may be representative of a computing device associated with the (communication platform) server(s) 102, a client referred to in process 500 may be representative of the user computing device(s) 104 and/or application 140. However, the process 500 is not limited to being performed by components in the environment 100.

In at least some examples, at operation 502, the process includes rendering, for display via a mobile client, a communication associated with a user account of a communication platform. For example, a rendered communication may include a notification 504 or a message 506 associated with the notification 504.

In at least some examples, at operation 508, the process 500 includes receiving a request to render, for display via a desktop client associated with the user account, a reminder associated with the communication. For example, an input may be received indicating a selection of the interface element 510 (e.g., which represents an reminders option to have a reminder presented when the user is at a desktop client) or a selection of the interface element 512 (e.g., which also represents an reminders option to have a reminder presented when the user is at a desktop client).

In at least some examples, at operation 514, the process 500 includes determining that a state of the desktop client satisfies a condition. For example, the desktop client 516 may determine the existence of a state (based on a condition) that indicates a user is at the desktop client 516 and/or an active state of the desktop client. In some instances, the condition may include the desktop client waking from a sleeping state, restarting, and/or being turned on, and the state may be detected based on an I/O device receiving an input (e.g., touchscreen input, keyboard input, laptop being opened, etc.) that wakes the desktop client. In some examples, the state may be detected based on a WebSocket or other communication state (e.g., establishing a network connection, such as a WiFi connection). In some examples, the state may be detected based on the communication application being opened, unhidden, launched, and/or logged onto.

In at least some examples, at operation 518, the process 500 includes rendering, for display via the desktop client and based on the condition being satisfied, the reminder associated with the communication. For example, in the user interface 520, one or more indications 522 and/or 524 of a reminder may be presented. In some examples, the reminder 526 may be presented (e.g., when one of the indications 522 or 524 is selected).

EXAMPLE CLAUSES

A: A method comprising: rendering, for display via a mobile client, a communication associated with a user account of a communication platform; receiving a request to render, for display via a desktop client associated with the user account, a reminder associated with the communication; determining that a state of the desktop client satisfies a condition; and in response to the condition being satisfied, rendering, for display via the desktop client, the reminder associated with the communication.

B: The method of paragraph A, wherein: the desktop client includes a desktop communication application; and the state is based on one or more of the desktop communication application being open, launched, unhidden, or logged onto.

C: The method of either paragraph A or B, wherein: the desktop client includes a computing device; and the state is based on one or more of the computing device starting up, waking, connecting to a network, establishing a communication protocol, or receiving an input.

D: The method of any one of paragraphs A-C further comprising, sending, by the desktop client and based on the condition being satisfied, an API call to a database including data associated with the request to render the reminder.

E: The method of any one of paragraphs A-D, wherein: the communication is a first communication, the request to render is a first request, and the reminder is a first reminder; and the method further comprises: receiving a second request to render, for display via the desktop client, a second reminder associated with a second communication; ranking, based on a criterion, the first reminder higher than the second reminder; and presenting the first reminder with higher priority than the second reminder.

F: The method of any one of paragraphs A-E further comprising: generating a second communication indicating the request to render the reminder was received; and rendering, for display via the mobile client and in a thread with the communication, the second communication.

G: The method of any one of paragraphs A-F, wherein the communication includes an action item assigned to the user account.

H: A system comprising: one or more processors; and one or more non-transitory computer readable media storing instructions that, when executed, cause the system to: render, for display via a mobile client, a communication associated with a user account of a communication platform; receive a request to render, for display via a desktop client associated with the user account, a reminder associated with the communication; determine that a state of the desktop client satisfies a condition; and in response to the condition being satisfied, render, for display via the desktop client, the reminder associated with the communication.

I: The system of paragraph H, wherein: the desktop client includes a desktop communication application; and the state is based on one or more of the desktop communication application being open, launched, unhidden, or logged onto.

J: The system of either paragraph H or I, wherein: the desktop client includes a computing device; and the state is based on one or more of the computing device starting up, waking, connecting to a network, establishing a communication protocol, or receiving an input.

K: The system of any one of paragraphs H-J, wherein the operations further comprise, sending, by the desktop client and based on the condition being satisfied, an API call to a database including data associated with the request to render the reminder.

L: The system of any one of paragraphs H-K, wherein: the communication is a first communication, the request to render is a first request, and the reminder is a first reminder; and the operations further comprise: receiving a second request to render, for display via the desktop client, a second reminder associated with a second communication; ranking, based on a criterion, the first reminder higher than the second reminder; and presenting the first reminder with higher priority than the second reminder.

M: The system of any one of paragraphs H-L, the operations further comprising: generating a second communication indicating the request to render the reminder was received; and rendering, for display via the mobile client and in a thread with the communication, the second communication.

N: The system of any one of paragraphs H-M, wherein the communication includes an action item assigned to the user account.

O: One or more non-transitory computer readable media storing instructions that, when executed, cause one or more processors to: render, for display via a mobile client, a communication associated with a user account of a communication platform; receive a request to render, for display via a desktop client associated with the user account, a reminder associated with the communication; determine that a state of the desktop client satisfies a condition; and in response to the condition being satisfied, render, for display via the desktop client, the reminder associated with the communication.

P: The one or more non-transitory computer readable media of paragraph O, wherein: the desktop client includes a desktop communication application; and the state is based on one or more of the desktop communication application being open, launched, unhidden, or logged onto.

Q: The one or more non-transitory computer readable media of either paragraph O or P, wherein: the desktop client includes a computing device; and the state is based on one or more of the computing device starting up, waking, connecting to a network, establishing a communication protocol, or receiving an input.

R: The one or more non-transitory computer readable media of any one of paragraphs O-Q, wherein the instructions, when executed, further cause the one or more processors to send, by the desktop client and based on the condition being satisfied, an API call to a database including data associated with the request to render the reminder.

S: The one or more non-transitory computer readable media of any one of paragraphs O-R, wherein: the communication is a first communication, the request to render is a first request, and the reminder is a first reminder; and the instructions, when executed, further cause the one or more processors to: receive a second request to render, for display via the desktop client, a second reminder associated with a second communication; rank, based on a criterion, the first reminder higher than the second reminder; and present the first reminder with higher priority than the second reminder.

T: The one or more non-transitory computer readable media of any one of paragraphs O-S, the instructions, when executed, further causing the one or more processors to: generate a second communication indicating the request to render the reminder was received; and render, for display via the mobile client and in a thread with the communication, the second communication.

U: Any one of paragraphs A-T, wherein: the condition includes a physical distance threshold, and the state includes the desktop client being located a physical distance from the mobile client that is less than the physical distance threshold.

V: Any one of paragraphs A-U, wherein: the communication is a new communication; and the method further comprises receiving, via the mobile client and before receiving the request to render the reminder, a request to create the new communication.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
    rendering, for display via a mobile client, a first communication associated with a user account of a communication platform;
    receiving a first request to render, for display via a desktop client associated with the user account, a first reminder associated with the first communication, wherein the first request to render the first reminder is based on an instruction from the mobile client;
    rendering, for display via the mobile client, a second communication associated with the user account;
    receiving a second request to render, for display via the desktop client, a second reminder associated with the second communication;
    ranking, based at least in part on whether a channel, a user account, or direct message associated with the first reminder is identified as important, the first reminder higher than the second reminder;
    determining that a state of the desktop client satisfies a condition; and
    in response to the condition being satisfied, rendering, for display via the desktop client, the first reminder associated with the first communication with a higher priority than the second reminder, wherein an indication of the first reminder is displayed as a direct message from a non-user account associated with the communication platform.

2. The method of claim 1, wherein:
    the desktop client includes a desktop communication application; and
    the state is based on one or more of the desktop communication application being open, launched, unhidden, or logged onto.

3. The method of claim 1, wherein:
    the desktop client includes a computing device; and
    the state is based on one or more of the computing device starting up, waking, connecting to a network, establishing a communication protocol, or receiving an input.

4. The method of claim 1 further comprising, sending, by the desktop client and based on the condition being satisfied, an API call to a database including data associated with the first request to render the first reminder.

5. The method of claim 1 further comprising:
    generating a third communication indicating the first request to render the first reminder was received; and
    rendering, for display via the mobile client and in a thread with the first communication, the third communication.

6. The method of claim 1, wherein the first communication includes an action item assigned to the user account.

7. The method of claim 1, wherein ranking the first reminder and the second reminder is further based at least in part on whether the first reminder and the second reminder are associated with a channel, a user account, or another communication associated with the communication platform.

8. A system comprising:
one or more processors; and
one or more non-transitory computer readable media storing instructions that, when executed, cause the system to:
render, for display via a mobile client, a first communication associated with a user account of a communication platform;
receive a first request to render, for display via a desktop client associated with the user account, a first reminder associated with the first communication, wherein the first request to render the first reminder is based on an instruction from the mobile client;
render, for display via the mobile client, a second communication associated with the user account;
receive a second request to render, for display via the desktop client, a second reminder associated with the second communication;
rank, based at least in part on whether a channel, a user account, or direct message associated with the first reminder is identified as important, the first reminder higher than the second reminder;
determine that a state of the desktop client satisfies a condition; and
in response to the condition being satisfied, render, for display via the desktop client, the first reminder associated with the first communication with a higher priority than the second reminder, wherein an indication of the first reminder is displayed as a direct message from a non-user account associated with the communication platform.

9. The system of claim 8, wherein:
the desktop client includes a desktop communication application; and
the state is based on one or more of the desktop communication application being open, launched, unhidden, or logged onto.

10. The system of claim 8, wherein:
the desktop client includes a computing device; and
the state is based on one or more of the computing device starting up, waking, connecting to a network, establishing a communication protocol, or receiving an input.

11. The system of claim 8, wherein the instructions further cause the system to send, by the desktop client and based on the condition being satisfied, an API call to a database including data associated with the first request to render the first reminder.

12. The system of claim 8, wherein the instructions further cause the system to:
generate a third communication indicating the first request to render the first reminder was received; and
render, for display via the mobile client and in a thread with the first communication, the third communication.

13. The system of claim 8, wherein the first communication includes an action item assigned to the user account.

14. The system of claim 8, wherein ranking the first reminder and the second reminder is further based at least in part on whether the first reminder and the second reminder are associated with a channel, a user account, or another communication associated with the communication platform.

15. One or more non-transitory computer readable media storing instructions that, when executed, cause one or more processors to:
render, for display via a mobile client, a first communication associated with a user account of a communication platform;
receive a first request to render, for display via a desktop client associated with the user account, a first reminder associated with the first communication, wherein the first request to render the first reminder is based on an instruction from the mobile client;
render, for display via the mobile client, a second communication associated with the user account;
receive a second request to render, for display via the desktop client, a second reminder associated with the second communication;
rank, based at least in part on whether a channel, a user account, or direct message associated with the first reminder is identified as important, the first reminder higher than the second reminder;
determine that a state of the desktop client satisfies a condition; and
in response to the condition being satisfied, render, for display via the desktop client, the first reminder associated with the first communication with a higher priority than the second reminder, wherein an indication of the first reminder is displayed as a direct message from a non-user account associated with the communication platform.

16. The one or more non-transitory computer readable media of claim 15, wherein:
the desktop client includes a desktop communication application; and
the state is based on one or more of the desktop communication application being open, launched, unhidden, or logged onto.

17. The one or more non-transitory computer readable media of claim 15, wherein:
the desktop client includes a computing device; and
the state is based on one or more of the computing device starting up, waking, connecting to a network, establishing a communication protocol, or receiving an input.

18. The one or more non-transitory computer readable media of claim 15, wherein the instructions, when executed, further cause the one or more processors to send, by the desktop client and based on the condition being satisfied, an API call to a database including data associated with the first request to render the first reminder.

19. The one or more non-transitory computer readable media of claim 15, the instructions, when executed, further causing the one or more processors to:
generate a third communication indicating the first request to render the first reminder was received; and
render, for display via the mobile client and in a thread with the first communication, the third communication.

20. The one or more non-transitory computer readable media of claim 15, wherein ranking the first reminder and the second reminder is further based at least in part on whether the first reminder and the second reminder are associated with a channel, a user account, or another communication associated with the communication platform.

* * * * *